United States Patent [19]
Kikuchi et al.

[11] Patent Number: 5,840,225
[45] Date of Patent: Nov. 24, 1998

[54] METHOD AND APPARATUS FOR INTEGRALLY ATTACHING A COVER MATERIAL TO A FOAMED ARTICLE

[75] Inventors: Masanobu Kikuchi; Norio Yanagishita; Koji Yamada, all of Ayase, Japan

[73] Assignee: Ikeda Bussan Co., Ltd., Ayase, Japan

[21] Appl. No.: 330,083

[22] Filed: Oct. 26, 1994

[30] Foreign Application Priority Data

Oct. 27, 1993 [JP] Japan .................................. 5-289771

[51] Int. Cl.⁶ .......................... B29C 67/00; B29C 67/20
[52] U.S. Cl. ...................... 264/46.6; 156/79; 264/46.4; 425/4 R; 425/112; 425/125; 425/441
[58] Field of Search ................. 156/77, 78, 79, 156/245, 500; 264/45.1, 46.4, 46.6, 259, 266; 425/125, 441, 256

[56] References Cited

U.S. PATENT DOCUMENTS

| | | | |
|---|---|---|---|
| 4,789,447 | 12/1988 | Konda | 425/112 X |
| 4,976,414 | 12/1990 | Tanagishita | 264/46.6 X |
| 4,988,282 | 1/1991 | Fukui | 425/4 R X |
| 5,047,184 | 9/1991 | Busch et al. | 264/46.6 |
| 5,127,813 | 7/1992 | Omata et al. | 264/46.6 X |
| 5,130,079 | 7/1992 | Sakamoto et al. | 264/46.6 X |
| 5,164,137 | 11/1992 | Omata et al. | 156/79 X |

FOREIGN PATENT DOCUMENTS 57-70739   11/1983   Japan .................................. 264/46.6

*Primary Examiner*—Adrienne C. Johnstone
*Attorney, Agent, or Firm*—Foley & Lardner

[57] ABSTRACT

A method of integrally bonding a foam seat pad or other article to a cover material includes steps of positioning a two ply cover material in a set stand of a lower mold. The set stand positions a main surface portion of the cover material in a desired alignment while a retaining member is used for provisionally maintaining the alignment. Side mold portions are moved in position to firmly surround the set stand and and the retaining member is removed. Then, foam resin is introduced into the space defined by the set stand and side mold portions and an upper mold is used to sealingly cover the molding apparatus. After the upper mold is closed pressurization of the internal space of the molding apparatus is effected for a desired time during setting of the foam resin.

10 Claims, 7 Drawing Sheets

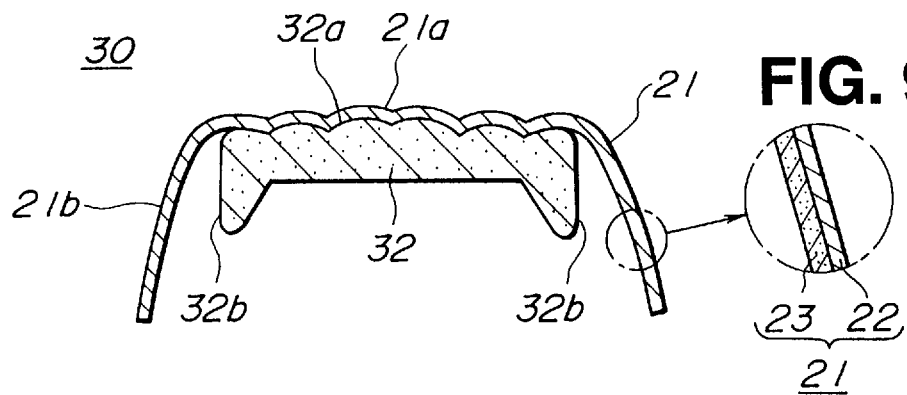
FIG. 9 ( A )
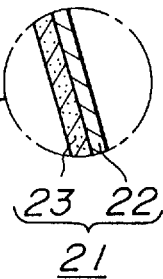
FIG. 9 ( B )
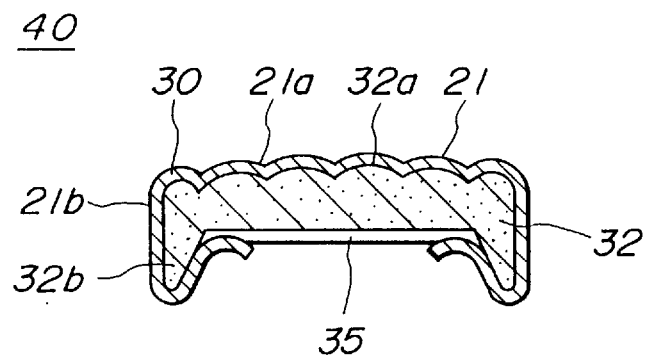
FIG.10

METHOD AND APPARATUS FOR INTEGRALLY ATTACHING A COVER MATERIAL TO A FOAMED ARTICLE

BACKGROUND OF THE INVENTION

1. Field of the Invention

The present invention relates generally to a adhering method for a surface material. In particular, the present invention relates to a one step method of forming upholstered articles for automotive vehicle interiors in which a cover material is affixed to a foam pad or the like for forming automotive seats etc.

2. Description of the Related Art

Generally, in manufacturing of automotive seats, upholstery and the like, a cover material is shaped so as to cover a pad material and adhesive is applied to at least one side of the pad and cover material for integrally joining the pad and cover material for forming a finished seat cushion, or the like.

However, when forming such as an automotive seat pad, wherein a side support portion, of metal or the like must be incorporated into the seat pad, it becomes difficult to assure that the pad covering, the side support member and the pad are accurately positioned such that slippage of the covering does not occur during processing. To prevent such slippage, pins and retainers must be applied to edge portions of the cover material and processing of the articles becomes time consuming and costly.

However, use of retainers such as pins or tape during processing complicates processing and also compromises the appearance of the finished article. In addition, during pouring of the resin from which the foam pad is formed into a molding apparatus wherein it contacts the resin material of the covering material, these materials mutually impregnate each other and adhere strongly, thus they are not easily separable.

Accordingly, dismantling of finished seat covers for recycling purposes or the like is complicated and the different materials of the seat cover may not easily be sorted since they are not separable along an impregnation thickness thereof.

Thus it has been required to provide a one step method of forming an automotive seat cushion in which slippage of the cover material is prevented while an article with clean appearance may be simply and reliably produced. In addition, the cover material must be easily separable from the pad material along a portion where the thicknesses thereof adhere to facilitate recycling.

SUMMARY OF THE INVENTION

It is therefore a principal object of the present invention to overcome the drawbacks of the related art.

It is a further object of the present invention to provide a one step method of forming an integral cushion with cover material in which slippage of the cover material during manufacture is prevented while an article with clean appearance may be simply and reliably produced.

In addition, another object of the invention is to provide an integral seat cushion with covering in which the cover material is easily separable from the pad along the border of contact therebetween for facilitating recycling.

In order to accomplish the aforementioned and other objects, a method of forming an article including an integral cover material is provided, comprising: positionally aligning a cover material to be joined to said article on a predetermined portion of a first lower mold for forming a first portion of said article; vertically lowering said first lower mold to a predetermined position; horizontally moving a second lower mold for forming a second portion of said article into a predetermined positional engagement with said first lower mold in a manner so as to define a molding space for forming said article and so as to retain said surface portion of said cover material in said positionally aligned condition; sealingly attaching an upper mold over said molding space for creating a sealed environment and introducing foam resin into said molding space; pressurizing said sealed environment so as to adjust a pressure of an atmosphere therewithin.

BRIEF DESCRIPTION OF TILE DRAWINGS

In the drawings:

FIG. 9(A) shows a seat cushion according to the processing method of the invention wherein the cover material is joined to the seat cover; FIG. 9(B) is an enlarged cross-sectional view of the cover material of FIG. 9(A) at a position where the cover material adheres to the foam; and FIG. 10 is cross-sectional view of a finished seat cover formed according to the method of the invention.

DESCRIPTION OF THE PREFERRED EMBODIMENT

Figure 1:
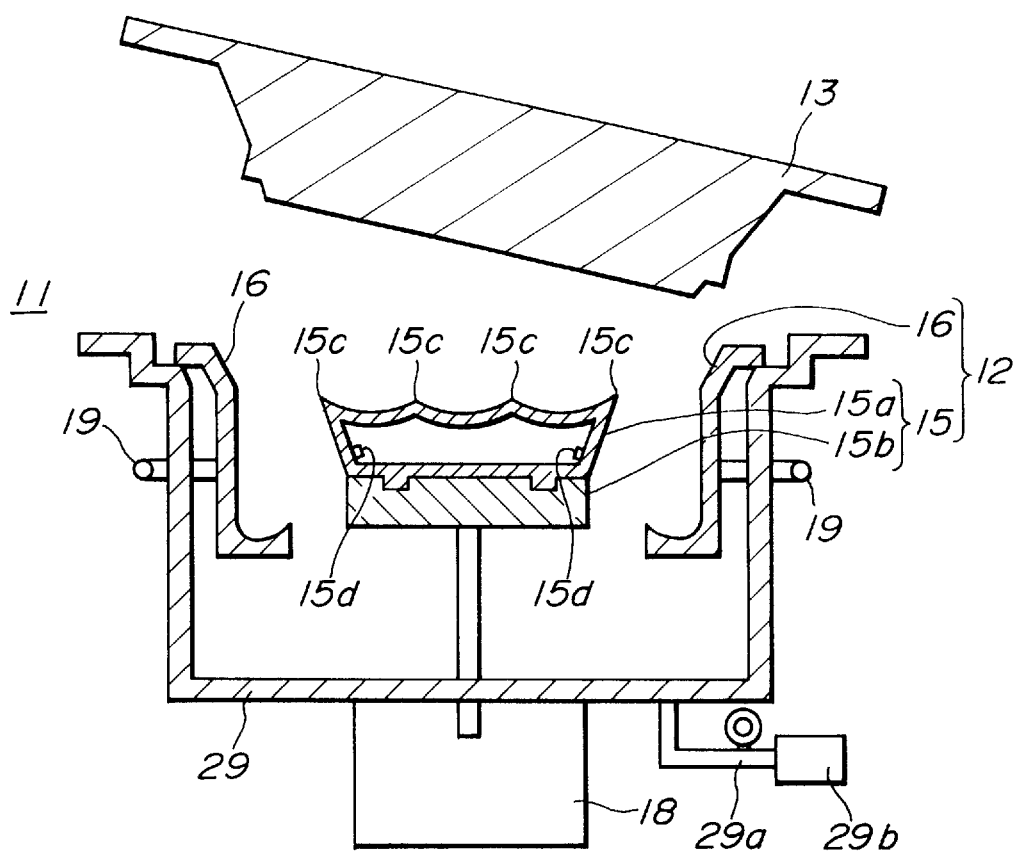
FIG. 1 shows a cross-sectional view of an apparatus for one-step forming of a pad with cover material according to the invention.

Referring now to the drawings, FIGS. 1–10, a first embodiment of the invention will be described hereinbelow in detail.

First of all, a molding apparatus 11 utilized for forming an article according to the invention comprises a lower mold 12 and an upper mold 13.

The lower mold comprises cover mounting portions 15a and 15b and side mold portions 16, 16. The cover mounting portions 15a, 15b are arranged as seen in FIG. 1, such that a lower mounting block 15b is fixed to a cylinder to be raised or lowered in relation to the side mold portions 16 by an up/down mechanism 18 and the set stand 15a is set atop the lower mounting block 15b.

The side mold portions 16 are movable inwardly and outwardly of the cover mounting portions 15a, 15b via an in/out mechanisms 19 respectively attached to a rear side of each of the side mold portions 16. As may be seen from FIG. 2, according to the present embodiment, four side mold portions 16 and associated in/out mechanisms 19 are utilized. The up/down and in/out mechanisms 18, 19 may be hydraulic cylinder arrangements or the like.

Figure 2:
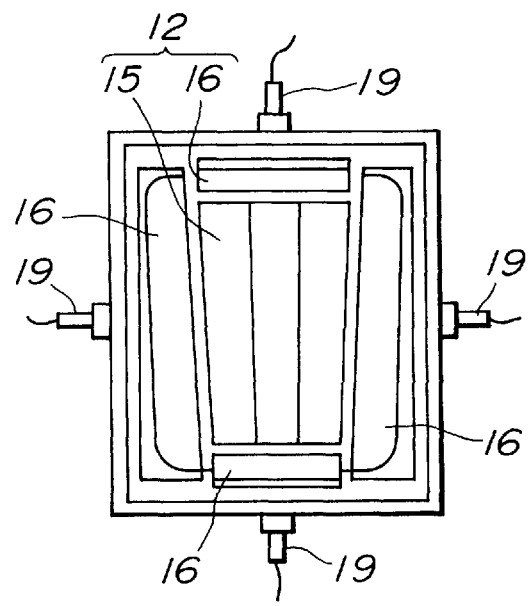
FIG. 2 is a plan view of a lower mold of the apparatus of FIG. 1 including a lower mold surrounding portion.

As may be understood from FIG. 2, when the side mold portions 16 are moved to their inward position closely surrounding the lower mounting block 15b on all sides thereof, the lower mold 12 is defined as the shape of a seat cushion to be formed by the molding apparatus 11 by pouring of a foamed synthetic resin therein for making the foam pad 32 (i.e. seat cushion, see FIG. 9).

For forming a seat cushion such as shown in FIG. 9, the method of the present embodiment utilizes a two ply covering material 21 including an outer skin layer 22 and an inner wadding layer 23. However, according to the present invention, it will be noted that a single ply covering material may alternatively be used. For forming the seat cushion, the outer skin layer 22 of a main surface portion 21a of the covering material 21 is laid face-down on the set stand 15a. Thus, when the foam resin 31 is introduced for forming the foam pad 32, the main surface 21a will be adhered to the upper side of the foam pad 32 while side portions 21b of the cover material 21 will hang freely to allow fitting around seat mounting member (not shown) etc., to be carried out as easily as possible.

Figure 3:
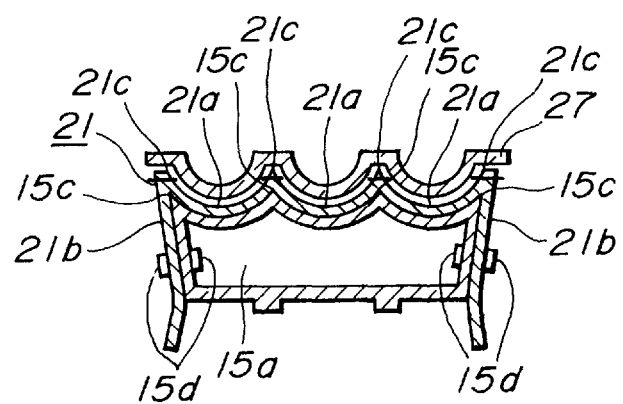
FIG. 3 shows a cover material set up step for processing for joining the cover material to a pad material according to the process of the invention.
Figure 4:
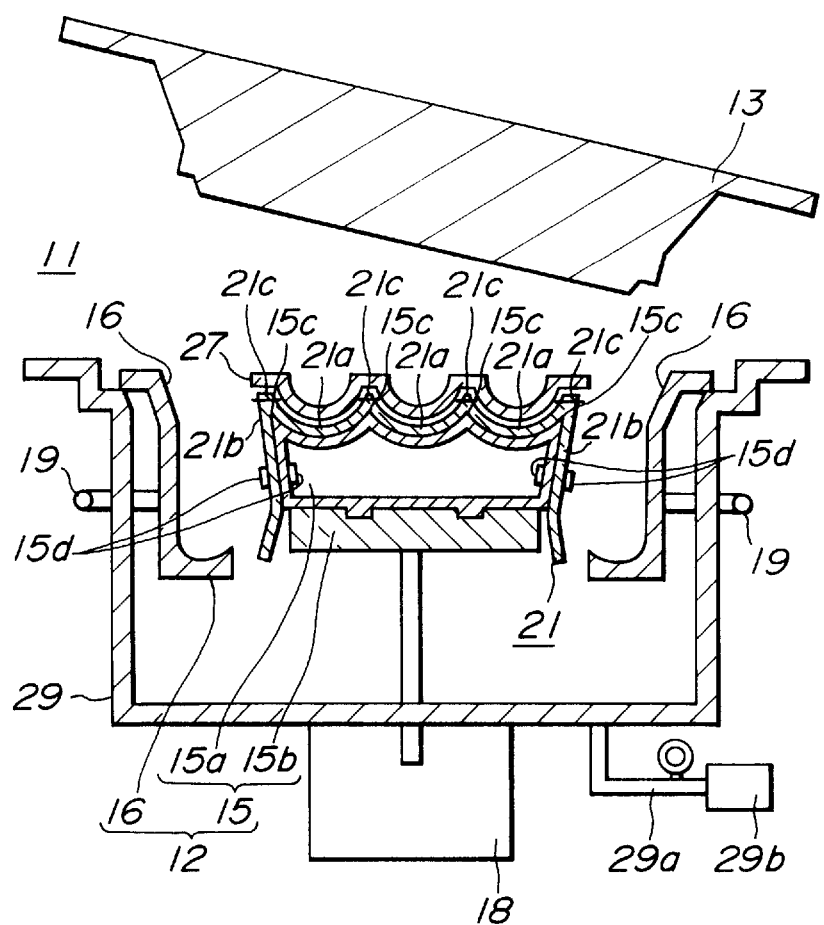
FIG. 4 shows a processing step in which the set up cover material is mounted in the molding apparatus.

Then, when the cover material is set face-down on the set stand 15a the wadding layer 23 is faced upwardly in the molding apparatus, as shown in FIGS. 3 and 4. Referring to FIG. 3, for assuring correct positioning of the main surface 21a of the cover material 21, aligning portions 21c, 21c of the main surface 21a are aligned with corresponding contour portions 15c, 15c of the set stand 15a and then a retaining member 27 is set on top of the set stand 15a for securely maintaining the positioning of the cover material 21 during processing. The retaining member 27 has a contour reciprocating the surface contours of the set stand 15 so as to closely squeeze the cover material 21 therebetween for assuring stable positioning as seen in FIG. 3. Side portions 21b are held to to sides of the set stand 15a by retainers 15d. During processing the mounting block 15b and set stand 15a are lowered by the up/down mechanism 18, as shown in FIG. 5 such that the side portions 21b of the cover material 21 are not contacted by the foam resin 31 (FIG. 6) during processing.

Referring now to FIG. 4, it will be noted that the molding apparatus 11 includes an outer casing 29 in which the above-described structure is wholly contained. The outer casing 29 is connected with a pressurized air supply 29b, such as a compressor or the like, via a pipe 29a. During processing, when all components of the upper and lower molds 12 and 13 are in position, when the foam resin 31 is introduced to the molding space for forming the foam pad 32, pressurized air may be introduced into the space surrounding the molds 15, 16 and external pressure may be adjusted during processing for controlling foam density etc., during manufacture.

Figure 5:
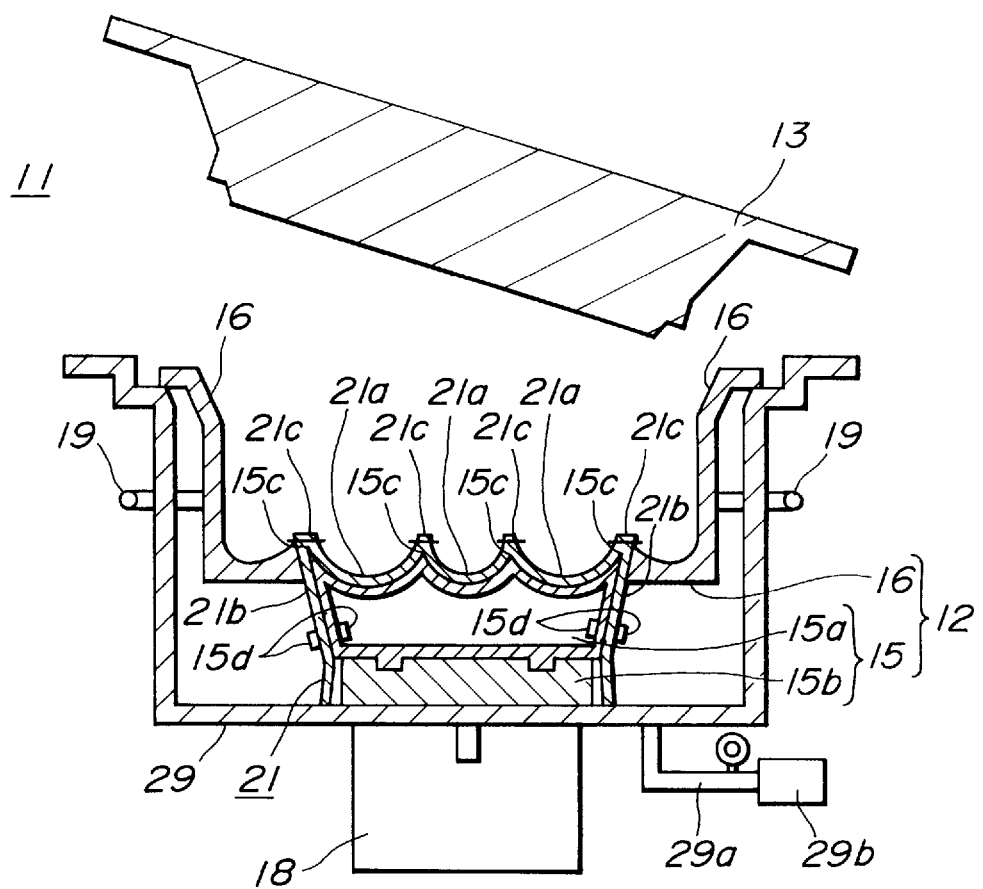
FIG. 5 shows a further processing step in which the mounted cover material is positioned in a lower portion of the molding apparatus.

Thus, once the above steps have been taken for positioning the cover material 21, the mounting block 15b is lowered while the side molds 16, 16 are moved inward by the in/out mechanisms 19, 19 such that the set stand 15a and the surrounding side molds 16, 16 are sealingly interlocked for forming a molding space therewithin, as seen in FIG. 5. The space between the rear sides of the side molds 16, 16, the set stand 15a and the outer casing 29 is thereby established in an airtight fashion and pressurization thereof may be controlled via the air supply 29b and the pipe 29a, which of course may be fitted with an air valve or the like.

Then, before processing for introducing the foam resin 31, the retaining member 27 holding the positioning of the main surface 21a of the cover material 21 may be removed, the positioning of the main surface 21a will now be maintained according to the pressing engagement of the molds 15, 16.

Figure 6:
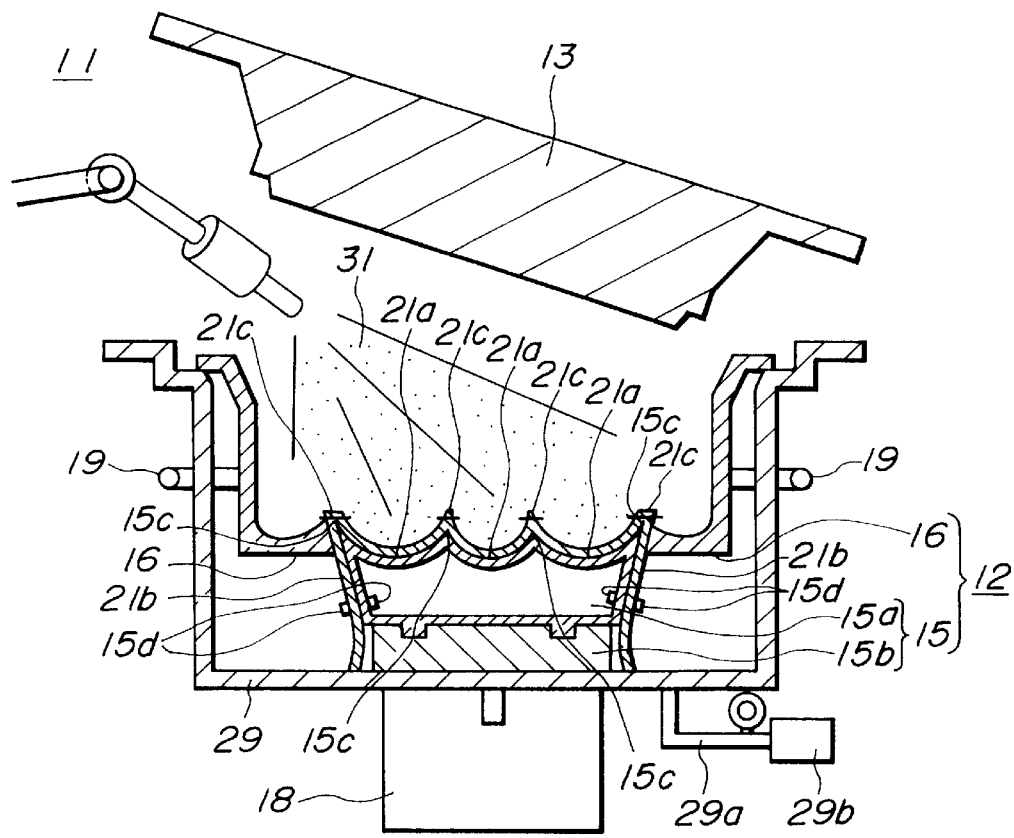
FIG. 6 shows a processing step in which foam resin material is poured into the molding apparatus to adhere to the prepositioned cover material.
Figure 7:
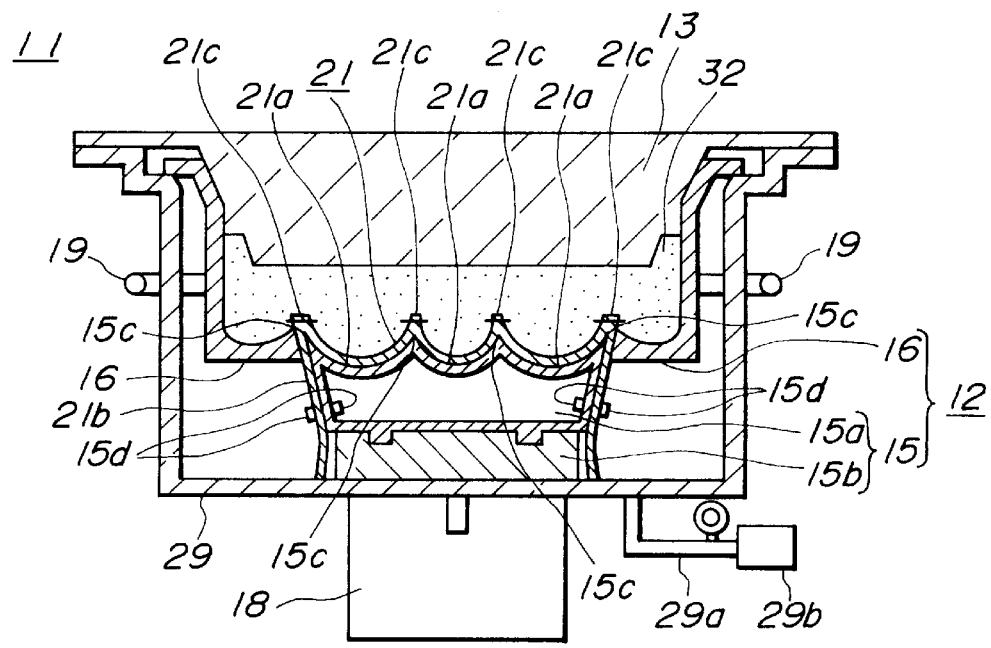
FIG. 7 shows a condition in which the mold is closed after pouring of the foam resin for setting and bonding of the seat cushion and integral cover.
Figure 8:
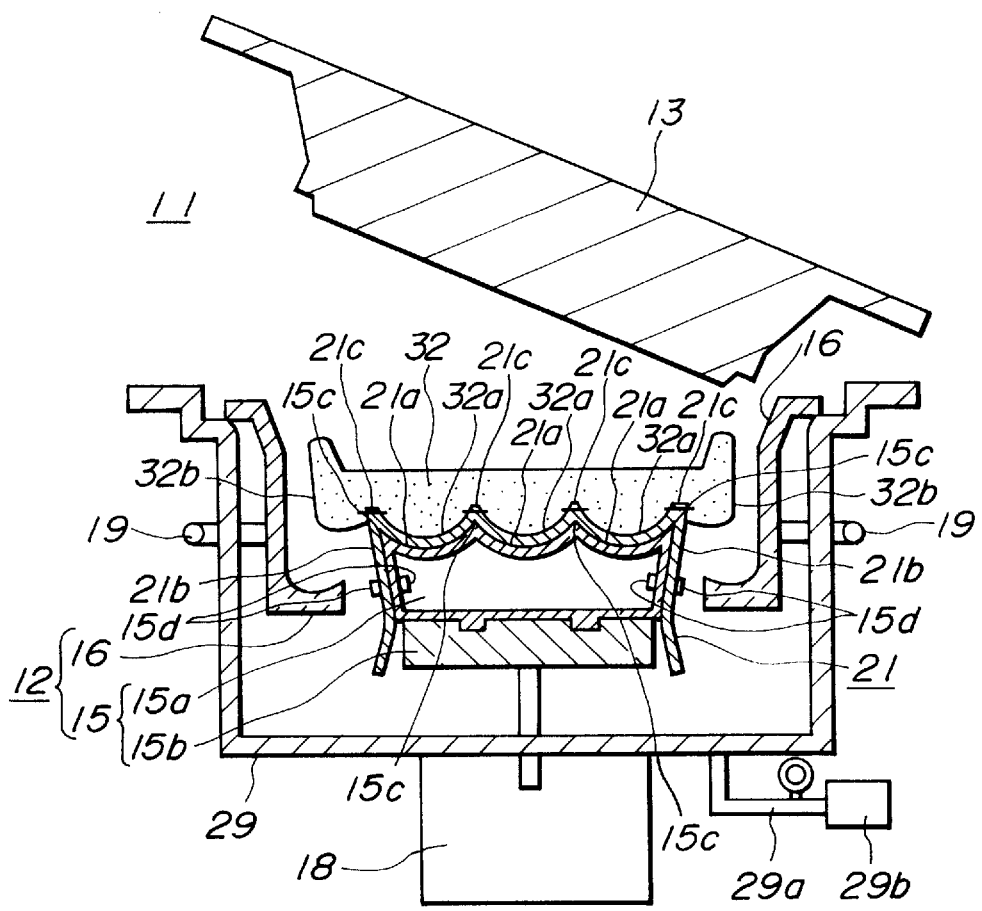
FIG. 8 shows a processing step wherein the molding apparatus is opened after setting of the foam.

Referring to FIG. 6, when the retaining member 27 is removed, foam resin 31 may be introduced through the top of the mold and then, as seen in FIG. 7 the upper mold 13 is fitted over the foam resin and pressurization of the outer casing 29 may be engaged for forming a foam pad 32 having an integrally attached cover according to the invention.

According to the pressure established in the outer casing 29 during setting of the foam resin a density of foam, pad thickness and the like may be adjusted. Also according to pressurization of the molding apparatus 11, a degree of impregnation of the foam resin into the wadding layer 23 of the cover material 21 may be established. According to the present emodiment, according to the use of a two-ply covering material, the wadding layer 23 may adhere strongly to the foam pad 32 but still allow easy separation of the foam pad 32 from the outer skin layer 22 of the cover material 21 and thus recycling of materials is simplified.

The pressurization preferably adjusts the air pressure within a range of greater than 0 to 1.0 kg/cm$^2$, most preferably 0.6 kg/cm$^2$ to 1.0 kg/cm$^2$. It will further be noted that the external pressurization established in the outer casing 29 of the molding apparatus 11 prevents leakage of the foam resin material 31 during setting thereof.

TABLE 1

| PRESSURE (kg/cm$^2$) | 0 | 0.3 | 0.6 | 1.0 |
|---|---|---|---|---|
| IMPREGNATION THICKNESS (mm) | 8 | 5 | 2.5 | 1.5 |

Table 1 shows examples of characteristics of foam pads formed according to the method of the invention utilizing different pressures during processing thereof.

It will be noted that, according to the invention, processing as set forth above with a wadding thickness of 10 mm at a pressure of 1.0 kg/cm$^2$, upon setting (solidification, drying) of the foam pad 32 an interpenetration layer between the wadding and the foam resin 32 having a thickness of substantially 1.5 mm will result. Also, the advantages of the invention may be obtained by establishing pressurization for only a short time, for example, one second of pressurization is sufficient for realizing the process of the invention.

After the above processing, pressurization is discontinued and the upper mold 13 is removed and while the lower mold components 15, 16 . . . are separated. According to this a workpiece 30 as shown in FIG. 9 is formed. That is a foam pad 32 having a cover material 21 integrally attached thereto at a main surface 21a thereo is formed with exact alignment being reliably maintained between the contours of the foam pad 32 and the surface features of the cover material 21.

The workpiece 30 may thus easily be finished according to attachment to a frame 35, as seen in FIG. 10 to form a finished seat cushion 40 or other such article. Since the side portions 21b of the cover material 21 are not adhered to the foam pad 32 the workpiece 30 may be easily adapted to fit over different frames 35 or seat mounting members etc.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A method for joining a cover material to a foamed article during formation of said foamed article comprising:

positionally aligning a cover material to be joined to said foamed article at a predetermined portion of a first lower mold such that said cover material is held in a positionally aligned condition;

vertically lowering said first lower mold to a predetermined position;

horizontally moving a second lower mold comprising a plurality of side mold portions into a predetermined positional engagement with said first lower mold so as to define a molding space therebetween, said molding space receiving foam therein, said first and second lower molds cooperatively retaining side portions of said cover material;

sealingly attaching an upper mold over said molding space for creating a sealed environment;

introducing foam resin into said molding space;

pressurizing said sealed environment above atmospheric pressure so as to adjust the pressure therewithin.

2. A method as set forth in claim 1, wherein said step of horizontally moving said second lower mold includes inwardly sliding the plurality of side mold portions of said second lower mold so as to surround said first lower mold for effecting said positional engagement and retaining said positionally aligned condition of said cover material.

3. A method as set forth in claim 1, further including steps of:

manually placing a retaining member proximate said predetermined portion of said first lower mold such that said cover material is interposed between said predetermined portion and said retaining member helping to maintain said positionally aligned condition of said cover material while said positional engagement between said first and second lower molds is established; and manually removing said retaining member after said horizontally moving said second lower mold.

4. A method as set forth in claim 1, wherein said cover material is a two layer material and an inner surface thereof comprises a wadding layer.

5. A method as set forth in claim 4, wherein said pressurizing step adjusts said air pressure within a range of greater than 0 to 1.0 kg/cm$^2$ above atmospheric pressure.

6. A method as set forth in claim 4, wherein said pressurizing step adjusts said air pressure within a range of 0.6 kg/cm$^2$ to 1.0 kg/cm$^2$ above atmospheric pressure.

7. A molding apparatus for forming a foamed article comprising:

a casing;

a lower mold disposed in said casing, said lower mold including a set stand capable of receiving a cover material thereon and said lower mold further including a plurality of side mold portions, said article having an outer peripheral portion and each of said set stand and said side mold portions being contoured and adapted to form the outer peripheral portion of the article, said lower mold cooperating with said casing to define within said casing a circumferential space surrounding said lower mold;

an upper mold cooperating with said lower mold to define therebetween a molding space;

means for introducing foamed resin into said molding space;

means for vertically lowering said set stand relative to said side mold portions;

means for horizontally moving said side mold portions into engagement with said set stand; and means for introducing pressurized air into said circumferential space.

8. A molding apparatus as claimed in claim 7, wherein said lower mold further includes a mounting block on which said set stand is placed.

9. A molding apparatus as claimed in claim 7, wherein said set stand includes contour portions and said apparatus further includes a retaining member having a contour reciprocating the surface contours of said contour portions of said set stand and thereby said retaining member cooperates with said set stand to define means for assuring correct positioning of the cover material.

10. A molding apparatus as claimed in claim 9, wherein the cover material includes a main surface having aligning portions, said contour portions of said set stand corresponding to said aligning portions of said main surface of the cover material.

* * * * *